United States Patent
Fritsch et al.

(10) Patent No.: US 9,767,368 B2
(45) Date of Patent: Sep. 19, 2017

(54) METHOD AND SYSTEM FOR ADAPTIVE RAY BASED SCENE ANALYSIS OF SEMANTIC TRAFFIC SPACES AND VEHICLE EQUIPPED WITH SUCH SYSTEM

(71) Applicant: HONDA RESEARCH INSTITUTE EUROPE GMBH, Offenbach/Main (DE)

(72) Inventors: Jannik Fritsch, Offenbach (DE); Thomas Weisswange, Offenbach (DE)

(73) Assignee: HONDA RESEARCH INSTITUTE EUROPE GMBH, Offenbach Main (DE)

( * ) Notice: Subject to any disclaimer, the term of this patent is extended or adjusted under 35 U.S.C. 154(b) by 56 days.

(21) Appl. No.: 14/941,752

(22) Filed: Nov. 16, 2015

(65) Prior Publication Data

US 2016/0171316 A1     Jun. 16, 2016

(30) Foreign Application Priority Data

Dec. 10, 2014  (EP) .................................. 14197121

(51) Int. Cl.
  *G06K 9/00*   (2006.01)
  *G06K 9/46*   (2006.01)
  *G06K 9/62*   (2006.01)

(52) U.S. Cl.
  CPC ..... *G06K 9/00805* (2013.01); *G06K 9/00536* (2013.01); *G06K 9/00791* (2013.01);
  (Continued)

(58) Field of Classification Search
  CPC ........... G06K 9/00805; G06K 9/00536; G06K 9/00791; G06K 9/00798; G06K 9/00825; G06K 9/46; G06K 9/6267; G06K 2209/23
  See application file for complete search history.

(56) References Cited

U.S. PATENT DOCUMENTS

| 8,364,311 B2 * | 1/2013 | Heracles ............... G06K 9/4671 |
| | | 382/224 |
| 2002/0095493 A1 * | 7/2002 | Byrnes .................... H04L 45/02 |
| | | 709/224 |

(Continued)

FOREIGN PATENT DOCUMENTS

| DE | 10 2012 008659 A1 | 11/2012 |
| EP | 0911779 A2 | 4/1999 |
| EP | 2 574 958 A1 | 4/2013 |

OTHER PUBLICATIONS

European Search Report dated Jun. 3, 2015 corresponding to European Patent Application No. 14197121.8.

(Continued)

*Primary Examiner* — Shefali Goradia
(74) *Attorney, Agent, or Firm* — Squire Patton Boggs (US) LLP

(57) ABSTRACT

A method and a system computationally performs scene analysis of semantic traffic spaces based on an adaptive spatio-temporal ray-based approach. The method includes acquiring a spatial semantic environment map including semantic context data, calculating at least one feature for at least one location on the spatial environment map taking into account the semantic context of the location and determining a category for the at least one location based on the at least one calculated feature. A feature is a ray based feature calculated by integrating input values along at least one ray extending in least one of a space dimension and a time dimension. The ray may have a ray shape corresponding to a general shape of a road and/or the at least one spatially extending ray follows a course of the road and/or is perpendicular to a surrounding road segment orientation.

11 Claims, 11 Drawing Sheets

(52) U.S. Cl.
CPC ..... *G06K 9/00798* (2013.01); *G06K 9/00825* (2013.01); *G06K 9/46* (2013.01); *G06K 9/6267* (2013.01); *G06K 2209/23* (2013.01)

(56) References Cited

U.S. PATENT DOCUMENTS

| | | | |
|---|---|---|---|
| 2011/0182475 A1* | 7/2011 | Fairfield | G06K 9/00825 382/104 |
| 2012/0078495 A1* | 3/2012 | Hamblin | G08G 5/0021 701/120 |

OTHER PUBLICATIONS

Joong-Tae Park et al., "Low-Cost Sensor-based Exploration in Home Environments with Salient Visual Features," Control Automation and Systems (ICCAS), 2010 International Conference on Control, Automation and Systems 2010, IEEE, Oct. 27, 2010, pp. 2218-2222, XP031836588.

Jan Oberlander et al., "A Semantic Approach to Sensor-Independent Vehicle Localization," 2014 IEEE Intelligent Vehicles Symposium Proceedings, IEEE, Jun. 8, 2014, pp. 1351-1357, XP032620260.

Jannik Fritsch et al., "Monocular Road Terrain Detection by Combining Visual and Spatial Information," IEEE Transactions on Intelligent Transportation Systems, IEEE, vol. 15, No. 4, Aug. 1, 2014, pp. 1586-1596, XP011555192.

Tobias Kuhnl et al., "Visual Ego-Vehicle Lane Assignment using Spatial Ray Features," 2013 IEEE Intelligent Vehicles Symposium (IV), IEEE, Jun. 23, 2013, pp. 1101-1106, XP032501869.

Tobias Kuhnl et al., "Spatial Ray Features for Real-Time Ego-Lane Extraction," Intelligent Transportation Systems (ITSC), 2012, 15th International IEEE Conference on Intelligent Transportation Systems, Sep. 16, 2012, pp. 288-293, XP032264072.

"Transport information and control systems—Adaptive Cruise Control systems—Performance requirements and test procedures," International Standard ISO 15622, Oct. 15, 2002 (32 pages).

* cited by examiner spatial-semantic representation

- car
- ego-lane
- opposing lane
- walkway
- off-road
- occupied spatial semantic representation

- car
- lane 1
- lane 2
- lane 3
- lane 4
- walkway
- intersection area road car spatial ray features 3.1: $AD^t$ (ray 4.1, car) = 10m
$AD^t$ (ray 4.2, car) = inf
3.2: $AD^t$ (ray 4.3, car) = inf local spatial scene classification yield (1) = 0,8 yield (2) = 0,0 yield area spatial-semantic
representation spatial ray features

3.1: $AD^t$ (ray 4.1, car) = 4 m 3.2: $AD^t$ (ray 4.2, car) = 7 m 3.3: $AD^t$ (ray 4.3, car) = inf 3.4: $AD^t$ (ray 4.4, car) = inf 3.5: $AD^t$ (ray 4.5, car) = 1 m global spatial scene classification narrow (3.1, 3.2, 3.3, 3.4, 3.5) = 0,75

METHOD AND SYSTEM FOR ADAPTIVE RAY BASED SCENE ANALYSIS OF SEMANTIC TRAFFIC SPACES AND VEHICLE EQUIPPED WITH SUCH SYSTEM

BACKGROUND

Field

The present invention relates to the field of automated computerized driver assistance for vehicles. The invention regards in particular a method and a corresponding program for computationally performing scene analysis of semantic traffic spaces based on an adaptive spatio-temporal ray based approach, the vehicle equipped with such a system and the system itself.

The invention is in the field of driver assistance based on for example at least one of computer vision, pattern recognition, classification and machine learning. The invention can in particular be implemented in a sensor-based computing module, which can be part of a car, a motorbike, or any other vehicle. The invention can be applied in realistic real-world traffic environments, such as encountered when driving a car in an unconstrained inner-city scenario.

An automated driver assistance system in a vehicle in most cases includes a sensor physically sensing the environment of the vehicle, and a computing unit, supplied with a sensor output signal, and computing an output signal which assists the driver in steering and controlling of the vehicle. The output signal may be supplied to optical or acoustical indication means and/or to a controller unit for controlling an actuator of the vehicle. An actuator of the vehicle might be a part of safety device, for example an inflator for an airbag system, or an actuator influencing the movement of the vehicle, for example brakes, accelerator, steering.

Automated driver assistance systems (ADAS) such as an "Adaptive Cruise Control" (ACC) system (for example described in ISO-Norm 15622:2010) increase driver comfort and safety. ACC systems are especially used for carrying out longitudinal control of a host vehicle, for example with respect to a target speed specified by the driver and ranging to other traffic objects such as other vehicles, for example cars, motorbikes, bikes, trucks or pedestrians. Driver assistance systems, for example lane change assistants, are based on predicting a future behavior of other participants in a traffic environment of a vehicle with aid of a prediction system.

The term "ego vehicle" will be used in the following description for a vehicle in a traffic situation which has a prediction system comprising the invention mounted thereon and which is equipped with the sensors and/or further means for acquiring traffic related data and a computing system that allows the computation of a possible or likely future behavior of at least one other traffic vehicle. The ego-vehicle is sometimes also referenced as host vehicle.

A sensor may be any means that can deliver information suitable for describing a traffic scene at a point in time by physically sensing an environment of the host vehicle. Such sensors may include one or more cameras, radar, lidar, laser scanner or the like. A data acquisition means may form part of the driver assistance system for acquiring any kind of information describing the traffic scene provided by one or more sensors or other data sources. In modern vehicles a human driver is often assisted by "active safety systems". Such active safety systems (in the following also referred to as "driver assistance systems") which can be a lane keeping assistance system physically sense the environment of the vehicle and extract information that is necessary for performing the driver assistance function. Based on this sensor signal processing the driver assistance system outputs a signal which can be fed to visual and/acoustic representations means, or it can be fed to an actuator (steering, brakes, safety belt pre-tensioning, airbag, . . . ) the action of which alters the state of the vehicle or its driving condition.

One type of such information on the environment of the vehicle that is highly relevant for driver assistance systems is the "road terrain". The road terrain in the context of the present invention is understood as the type of surface of the road on which the vehicle drives or can potentially drive. The road terrain is thus a part of the environment that is semantically important for the task of driver assistance. The road terrain includes—on an upper level—also sidewalks, off-road terrain, traffic islands etc. All areas with surfaces accessible to a vehicle may form part of the traffic space available to a vehicle.

A further type of information about the environment of the vehicle that is important for driver assistance systems are surrounding objects. Such surrounding objects which a vehicle in a typical road scenario encounters are often elevated so that they cannot be driven over. Such elevated objects are e.g. other vehicles, buildings, trees and traffic signs.

Identifying a specific road terrain category by the above denoted types of information can in general be performed with a variety of sensors providing, for example, camera images, depth information or GPS/map data.

An evaluation of a vehicle's maneuvers or future maneuver options uses a representation of the vehicle's environment. One such representation of a vehicle's environment is in the form of an "occupancy grid". An occupancy grid is map like description of the environment which is two-dimensional and in which each grid point constituting the occupancy grid includes information if it is occupied by an obstacle and if it belongs to road terrain. The occupancy grid (grid) may also be described by the plurality of individual grid cells constituting the grid.

Description of the Related Art

The detection of road terrain from acquired camera images by classifying selected locations is shown in EP 2 574 958 A1. Locations in a top-view projection of pixel confidences are selected as base points. A spatial feature generation of the base points is based on a value continuous confidence representation capturing visual and physical properties of the environment. Directed straight rays extend from the base points in different directions according to a fixed set of angular orientations. The extracted features are used for classifying road terrain using both local properties of sensor data and the spatial relationship in the feature extraction process. The classification results in assigning a semantic label such as "road terrain", "own lane" to a part of the traffic space that can potentially be driven over.

In EP 0911779 A2 a general traffic situation is classified into categories (classes) such as "accident", "congestion/traffic jam", based on image processing of data acquired from traffic surveillance data.

DE 10 2012 008 659 A1 shows a situation analysis by classification of traffic situations from the perspective of other entities determining based on relative distances to other entities and to road boundaries and occupied spaces if the other entities will execute a cut-in or cut-out maneuver. DE 10 2012 008 659 A1 classifies based on acquired image data, data received via vehicle-to-vehicle and vehicle-to-infrastructure communication and uses an occupancy grid as well as map information. The classified traffic situations are used for predicting future behavior of the other entities.

The state of the art approaches for classifying a traffic scene take the perceived context and therefore acquired spatial data into consideration. The classification is therefore based only on such information which is directly measurable, for example in case of an optical sensor means which is visible. The classification according to the state of the art lacks therefore awareness with respect to features which are not directly measurable but nevertheless strongly influence the understanding of a traffic scene under analysis.

The known situation recognition ignores the overall spatial layout of a scene and only evaluates the relations between different entities in a traffic scene, possibly also representing the road as one of entities. Current scene classification methods either use conventional image processing methods in order to label a whole traffic scene or to relate traffic participants to each other to determine specific situations in a scene. However a spatial layout of the semantics of the sensed environment is disregarded, for example where is road is neglected, instead the prior art focus on explicit relations between entities, for example "is on road".

While the sensor means are suitable to acquire spatial data which enable to perceive context of a traffic scene, for example lane markings, curbstones, road surfaces, the interpretation of the sensed spatial data is neglected in the prior art approach. The prior art relies on a perceived context for analysis of the traffic space. Further information referring to a semantic context is neglected. Semantic context interprets a perceived context in order to assign a category to elements in a traffic scene. In case of a perceived context identifying a "road", the semantic context identifies for example the category "own lane area".

SUMMARY

It is an object to improve analysis and classification of a traffic scene over the prior art approaches.

The invention according to the independent method claim and the corresponding system, vehicle and program claims solves the problem with the advantage of classification of the spatial scene properties of a specific location or cell or even the complete environment of an ego-vehicle by taking into account the spatial semantic context of each cell also denoted as location.

A method for spatial analysis of a traffic scene solving the problem comprises a step of acquiring a spatial semantic environment map including semantic context data. At least one feature for at least one cell on the multi-dimensional spatial environment map taking into account the semantic context of the cell is calculated. In a subsequent step of determining a category for the at least one cell based on the at least one calculated feature a classification for the cell respective the at least one feature is performed. The result of the classification is then output in an analysis signal comprising data about the determined category of the at least one cell for predicting a traffic scene or for further action by actuators of a vehicle for information and warning of the driver.

The classification of spatial scene properties of specific cells or even the complete environment of the ego-vehicle is performed by taking into account the spatial semantic context of each cell contrary to the conventional approach in the state of the art. Hence the claimed method for spatial analysis regards not only the sensed environment but also extracted features which integrate abstract values how the perceived values are to be interpreted. The spatial layout of the directly perceived environment is augmented by using features describing the spatial layout of the semantics of the perceived values. The features according to the claimed method are computed taking into account for example the semantic context of "own lane area", and are based therefore on a higher level of abstraction than asphalt area between lane markings as perceived by a sensor means.

The classification method provides the further the advantage of regarding labels in the classification process for labels which are not directly visible or measurable in an image of the environment as perceived by sensor means. An example of such a label referring to a category (class) may be "risky".

It is particularly preferred that the at least one calculated feature is a ray-based feature calculated by integrating input values along at least one ray extending in least one of a space dimension and a time dimension and starting from the cell to be labelled. Hence the claimed method extends beyond the mere analysis of the traffic environment in space but also provides the capability to analyse a predicted development of the traffic environment into future and therefore in a time dimension or a spatio-temporal dimension including time direction in addition to a three-dimensional space.

Preferably the at least one ray has a ray shape which is determined based on the semantic context of the at least one cell to be labelled. In particular the extension to more general ray shapes such as adapted ray shapes which are adapted according to underlying spatial distribution of the semantic context data ("spatial substrate") provides a powerful tool for analysis for generating high quality information.

It is particularly preferred that the at least one ray is a spatially extending ray has a ray shape corresponding to a general shape of a road and/or the at least one spatially extending ray follows a course of the road and/or is perpendicular to a surrounding road segment orientation and/or bypasses at least one area on the spatial semantic environment map. The spatially extending ray can be determined based on the label of the origin cell being the ray's starting point or cell to be labelled.

The conventional situation recognition generally ignores the overall spatial layout of a scene with respect to the semantic context. The invention classifies a scene based on features computed based on a spatial layout of the semantic context and therefore provides spatial interpretation. The spatial interpretation extends beyond the mere evaluation of relations between different entities in the scene. Therefore the inventive method provides the advantage of integrating the spatial layout of the semantic interpretation of the traffic scene into the analysis. The spatial layout of the semantics provides for example information about where a road actually is, how much road there is, instead of simply focusing on explicit relations such as "is on road".

The invention provides the further advantage, that the feature calculation is performed in an adaptive manner, adapting the ray shape to the semantic context of the origin cell of the ray. The inventive method further provides for sampling the traffic space with general rays for computing the ray-based features. The arbitrary rays employed for computing the features are not only straight rays at regular angular orientations extending from a origin cell as known from prior art, but take into account the spatial complexity of the content of the underlying representation and even may have a temporal dimension. The generalized arbitrary rays can for example be curved in order to follow a road curve or be bent in an intersection area to turn from a lane of the origin cell into an arriving lane. The generalized arbitrary rays may comprise multiple ray portions, each portion corresponding to a different time layer (slice) of a spatio-temporal representation of the environment of the ego-vehicle, when the spatio-temporal representation of the environment consists of a plurality of layers each representing a spatial representation of the environment for a discrete point in time t.

The inventive method is also suitable to classify a whole traffic scene and in particular for determining categories for specific areas in the environment with their meaning for the ego-vehicle.

In a preferred embodiment the at least one feature corresponds to a distance for which integrated input values integrated along the at least one ray exceed at least one predetermined threshold.

In an embodiment the method for spatial evaluation of a traffic scene is performed separately for at least one further cell on the spatial semantic environment map.

In a preferred embodiment the method comprises labelling the at least one cell on the spatial semantic environment map, wherein the label is determined based on the determined category for the at least one cell. A label for a location corresponds to a category or class determined for this cell as a result of the analysis (evaluation), for example "risky", "crowded", "narrow", "potentially occupied", "yielding area", "stopping area", "pedestrian area" . . . .

In an embodiment the method comprises determining the category of each ray based feature of a set of ray based features or on a selected number of ray based features of the set of ray based features.

In a preferred embodiment the method comprises determining a general scene category for the traffic scene based on the spatial analysis of the traffic scene. A general scene category for a traffic scene provides an overall scene categorization such as "traffic jam", "parking lot", "pedestrian area", shared road", risky", low speed required", . . . .

In an embodiment the spatial semantic environment map comprises areas corresponding to one or a plurality of cells labelled with an area type, and/or the spatial semantic environment map comprises multiple layers, wherein the layers refer to different time points in a time dimension. The areas in the input spatial semantic map may for example be labelled with a lane type, or for example as "road", "walkway", "crossing", vehicle (car), "intersection".

The technical problem is solved by a system for spatial analysis of a traffic scene, the system comprising an acquisition means configured to acquire a spatial semantic environment map including semantic context data, a ray determination means configured to determine the at least one ray having a ray shape based on the semantic context of the at least one cell, a spatial ray feature extraction means configured to calculate at least one feature for at least one cell on the spatial environment map taking into account the semantic context of the cell, a classification means configured to determine a category for the at least one cell based on the at least one calculated feature, and an output means configured to generate and output an analysis signal comprising data about the determined category of the at least one cell for analysing a traffic scene.

It is particularly preferred that the system for spatial analysis of a traffic scene includes the spatial ray feature extraction means which is configured to calculate the at least one feature as a ray based feature, wherein the ray based feature is calculated by integrating input values along at least one ray extending in at least one of a space dimension and a time dimension.

In a preferred embodiment the system for the spatial analysis of a traffic scene further comprises a ray shape determination means configured to determine the at least one ray having a ray shape based on the semantic context of the at least one cell.

The technical problem is further advantageously solved by a vehicle including a system for the spatial analysis of a traffic scene. The vehicle including a system for the spatial analysis of a traffic scene may include a driver assistance system that is configured to influence control of the vehicle (ego-vehicle) based on an output signal of the driver assistance system. The influence of control may be executed by means of direct actuators influencing lateral or longitudinal control of the vehicle or by informing or warning a driver by at least one of visual, acoustic and haptic means.

The technical problem is further solved by a computer program with program-code means for executing the method steps according to an embodiment of the invention when the program is executed on a computer or digital signal processor.

BRIEF DESCRIPTION OF THE DRAWINGS

The inventive method and system are explained in more detail with reference to the attached figures, wherein.

Components having the same numerals in the figures denote the same components.

DETAILED DESCRIPTION

Figure 1:
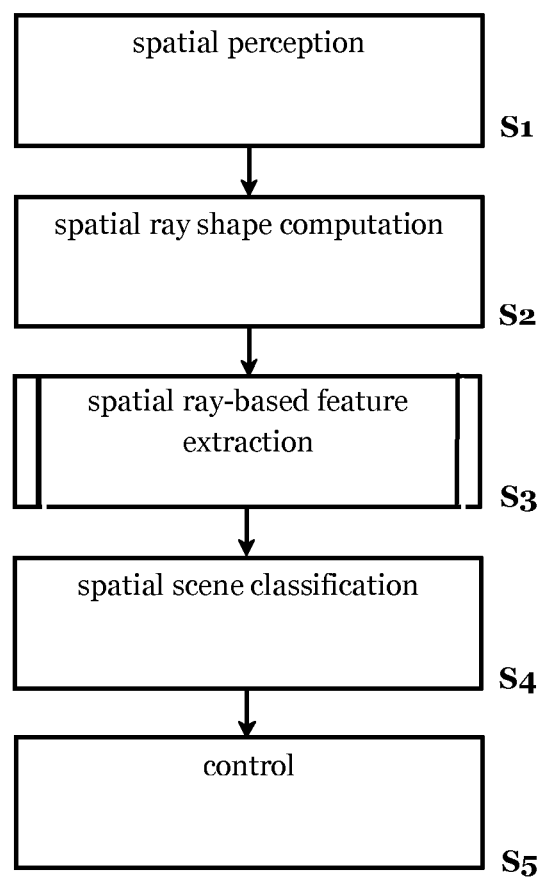
FIG. 1 is a flowchart depicting an embodiment of the inventive method.

The method according to the invention is performed on or by the ego-vehicle or a respective computing system on board of the ego-vehicle being equipped with one or more sensor means.

A sensor may be any means that can acquire information suitable for describing a traffic scene at a point in time. Such sensors may be cameras, radar, lidar or the like. Besides an active or passive sensor means for acquiring information, further information may be acquired by means of other systems, for example communication systems, car-to-car communication systems or infrastructure-to car communication.

Before describing exemplary embodiments of the invention, some general definitions of the terms used are given.

In the following a scene, sometimes also referred to as spatial scene denotes the current state of the environment surrounding a host vehicle (ego vehicle). The state of the environment comprises as parts of a scene for example a shape of a road, a type of a place in the scene, information on driveable areas, information on terrain not accessible for an ego-host vehicle, a traffic situation.

A representation of a state of a traffic object is produced by a computing means based on the acquired data provided by at least the sensing means. The state of a traffic object may be defined by one or more of the following parameters: location, direction, speed and any derivative thereof. The ego-vehicle represents the state of other traffic objects by suitable approximate probability distributions (APD). For example each discretized state of an other traffic object has a certain probability value which represents the probability that the traffic object is actually in this state.

An entity-based representation interprets all parts characterizing a scene as a vector of properties of the respective part of the scene. A vehicle forming part of the scene may be represented by a vector whose components correspond for example to a vehicle type, a position of the vehicle, a velocity and driving direction of the vehicle, an acceleration of the vehicle.

A spatial representation interprets all parts of a scene as covering a certain area of the environment. The spatial representation usually is an area viewed as a top view projection onto a discrete grid representing the environment. An example of a spatial representation may be an area comprising grid cells on the grid covered by asphalt or grid cells interpreted as belonging to a road.

An entity situation denotes a part of a scene that describes relations between a number of traffic entities. The traffic entities include the ego-vehicle, other traffic objects and even road structures. An entity situation may for example define a vehicle that has to give way to another vehicle arriving at an unsigned intersection on a road from the right of the vehicle.

A perceived context denotes spatial data acquired by a sensor means. Sensed spatial data may for example include lane markings or a road surface such as asphalt.

Semantic context is defined as an interpretation of the perceived context in order to assign labels defining a category. The category for a cell is the result of a classification process evaluating one or more features and which provides the category with a certain confidence value. For example a category and a corresponding label may be "own lane area" ("ego-lane").

Some approaches use context information to directly adapt a model to verify the sensor information. The context information is information going beyond the current state of an ego-vehicle, for example on other objects in the vicinity of the ego-vehicle or the specific road environment, such as road shape, traffic regulation at an intersection, lane information.

The spatial semantic environment map 1 is a multi-dimensional representation of the environment showing a grid comprising a plurality of grid cells 2. Each grid cell may be 2 represented by a grid point. Each grid cell may include one or more labels denoting a semantic context (characteristic) of the grid cell. The spatial semantic environment map may be for example a two dimensional map of a surface and including multiple layers, each layer representing the two-dimensional environment with respective semantic labels for a discrete point in time t.

FIG. 1 provides a flowchart describing the method for a spatial analysis of a traffic scene according to an embodiment of the invention.

In a step S1 the environment of an ego-vehicle is sensed and the acquired sensor data is processed. The processing may for example comprise a pre-processing of the raw sensor data, the evaluation of direct and indirect indicators, the evaluation of context information, the generation of prediction information. The result of generating a spatial perception of the traffic scene in step S1 may be represented by a spatial representation of the environment of a ego-vehicle, using a plurality of grid cells as viewed from the top and wherein each grid cell one or multiple semantic labels are assigned. The semantic labels may for example include "occupied", "road", "lane", "ego-lane", "vehicle" and so on. The semantic representation of the environment is output after step S1 in the form of a spatial environment map which may be more than two-dimensional and in particular can include one or more layers (slices) in a discrete time direction.

The method according to the invention proceeds by selecting a number of grid cells corresponding to spatial locations for which a number of features will be computed along spatial or spatio-temporal rays.

In step S2 there are ray shapes for these rays determined. The ray shapes are adapted to the context of the underlying semantic representation contained in the spatial semantic environment map. In one embodiment all ray shapes predefined and stored in a set (pool) of ray shapes are used. In another embodiment only a specific subset of ray shapes are selected from the whole set of available ray shapes. The selection of ray shapes may include selecting one or more predefined templates for ray shapes and adapting the selected templates to the specific spatial layout of the semantic context, for example by adapting to a specific road curvature radius or a specific intersection geometry. Ray shapes can also be selected according to a predominant driving direction associated to an originating cell as a starting point for the ray. The selection of the ray shape or of a ray shape function describing the shape of the ray is also made dependent on the classification task at hand. For example for the task of classifying "yield spaces" right turning rays are most valuable if the underlying semantic context includes a respective intersection with the respective right-of-way regulations in a right hand side traffic system for example. If for example the classification task of a category of "narrow" is to be addressed, the shape of the rays perpendicular to the road shape will provide useful information.

After determining the spatial and/or temporal ray shape, the spatial ray-based feature extraction in step S3 is performed. The principle of spatial ray-based feature extraction is explained in more detail with respect to FIG. 2 below.

In step S3 one or more features are computed by integrating values of one label or a whole group of semantic labels for the grid cells constituting the underlying grid of the spatial environment map. The values being integrated are binary or confidence values for a semantic label. The integration of the values along the ray is executed and the distance or distances along the ray until one or more predefined thresholds are exceeded by the integrated values is measured. A feature may comprise one or more distances determined in such manner.

All input features of all rays for a given origin cell are then provided to a classifier for spatial scene classification in step S4. Based on the calculated features a category for the given origin cell is determined. The determined category or class for the origin cell can include the category or class as a sort of label for the origin cell and can also include a confidence value or probability for the respective category for the origin cell.

The result of step S4 classifying the spatial scene may provide a label for the entire scene. In one embodiment step S3 will result in a spatial map of origin cells labelled with specific classifiers on which a trajectory of the vehicle in a trajectory planning module of an automated driving assistance system may be planned. A density or accuracy of the generated map may vary with the number of the selected grid cells as origin cells. A spatial map comprising cells labelled as "risky" may serve for the purpose of planning a trajectory for an ego-vehicle avoiding areas with a certain risk.

An embodiment combines the features of all origin cells into one single descriptor. A classifier then decides about the general scene and/or environment state category of the complete spatial representation proving the base data for the feature extraction of step S2.

The pooling of features may also be performed on a part of the extracted features only for forming a descriptor without deviating from the invention.

Figure 2:
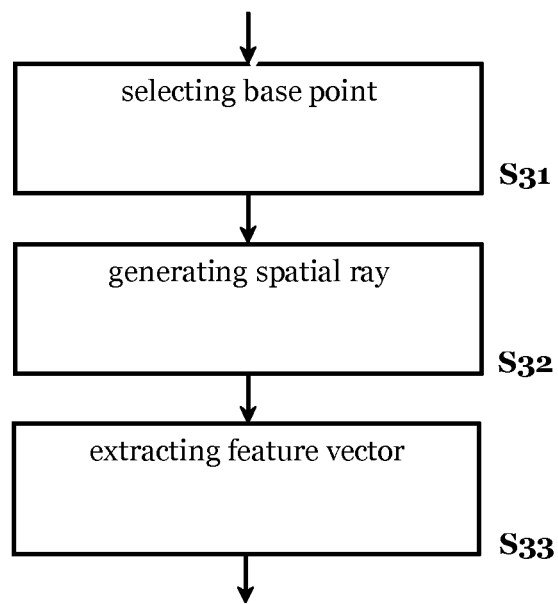
FIG. 2 shows an example of ray generation as used in a an embodiment of the invention.

FIG. 2 gives an exemplary sequence of steps for performing the ray based feature extraction step S3 in FIG. 1. The feature extraction in the steps S31 to S33 is shown for the special example of straight rays for showing the underlying principle. Corresponding steps to those steps S31 to S33 shown in FIG. 2 are to be executed to extract features using arbitrary ray shapes such as curved rays.

The spatial semantic environment map 1 of FIG. 3 is two-dimensional and shows a grid comprising a plurality of grid points 2. Each grid point 2 represents a grid cell. The term grid point 2 and grid cell can therefore be exchanged in the following discussion without deviating from the principle of ray based feature extraction.

The ray based feature extraction step S3 starts with selecting at least one origin cell 3 (BP—also called base point or base cell) as a specific location on the spatial semantic environment map 1 in step S31 of FIG. 2. Preferably a plurality of locations on the spatial semantic environment map 1 is selected as origin cells 3 for calculating spatial rays 4 extending from the selected origin cell 3.

In a step S32 of FIG. 2 at least one or even a plurality of spatial rays 4 is generated. Each spatial ray 4 has a specific ray shape being computed based on a semantic context of the origin cell. The specific ray shape may for example be selected from a set of available ray shapes. A selection criteria for the specific ray shape may be a semantic context label of the origin cell in a spatial semantic environment map 1. A ray shape may further be computed by adapting a selected specific ray shape to specific geometric dimensions of the surroundings of an origin cell. From each origin cell (base point) 3 a plurality of spatial rays 4 may originate and extend up to the borders of the spatial semantic environment map 1 or to a specific ray end point or maximum length.

Although the spatial ray 4 is discussed here comprising a ray shape extending in space, other ray shapes extending in space and in time, or ray shapes extending exclusively in time are also possible. The appropriate ray shape for a spatio-temporal scene categorization can be selected out of a plurality of predefined and stored ray shapes. The suitable ray shape may be selected according to a scene context from a number of stored templates and adapted to the specific scene context. The suitable ray shape may be calculated from at least one of a perceived spatial and/or temporal scene.

In a subsequent step S33 the feature vector is extracted based on the generated spatial rays 4.

The generation of a spatial feature for a grid cell 3 as a specific location in the environment of the vehicle comprises extracting a ray 4 according to the spatial ray shape calculated in step S2. A ray is defined as an arbitrarily shaped line starting from the location of the grid cell 3 on the spatial semantic environment map, and analyzing for example confidence values along the ray to extract a spatial feature. The analysis of the confidence values along the ray 4 is performed for example by integrating the confidence values along the ray 4, and extracting a ray length, at which the value of the integral exceeds an absorption threshold, which is a certain numeric value.

Figure 3A:
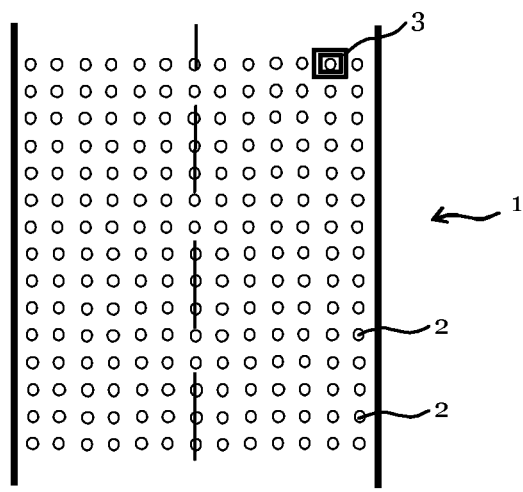
FIG. 3A is an example of a spatial grid as used for feature computation based on spatial rays.

Taking the spatial semantic environment map 1 as input for a defined number of origin cells 3 in the metric representation, spatial feature vectors are extracted. The distribution of origin cells is in this example defined on a grid as shown in FIG. 3A. The spatial layout with respect to the spatial semantic environment map 1 is captured at different origin cells 3 by the rays 4. A ray 4 includes all confidence values along a line with a certain ray shape and possibly a changing orientation of the line during course of the line, starting from a specific origin cell 3 and ending at the border of the metric representation. To convert this information into a defined number of feature values, an integral of the confidence values along the ray 4 is computed, which can be interpreted as absorption of confidences along the ray 4. A certain number T of absorption thresholds $t_i$ with i=1, 2, 3, . . . is defined. The absorption distances $AD(t_i)$, each absorption distance being the distance from the origin to where the integral value reaches a certain threshold $t_i$ on the ray 4, wherein i denotes the number of the threshold, are obtained as spatial features. The generation of the spatial features for a number of R rays is performed for each of the selected origin cells 3 and each of the rays 4 with the computed ray shapes.

Preferably, for a specific location in the environment at least one ray and at least one absorption threshold is used to generate a feature vector that encodes the relative position to a local property given by a confidence value of the spatial semantic environment map 1. Preferably multiple rays 4 for a specific grid cell 3 result in R*T absorption distances. The absorption distances serve as elements in a feature vector forming the spatial features for the spatial scene classification. The absorption distances describe the spatial layout of the scene, captured in the spatial semantic environment map 1 of the properties, relative to the predefined grid cells 3.

Preferably the analysis of the confidence values along the ray 4 is performed by integrating the confidence values along the ray 4, and extracting the ray length, at which the integral exceeds an absorption threshold, which is a certain numeric value. However other methods for analyzing labels of grid cells along the ray such as counting occurrences are also possible.

Preferably, for a specific location in the environment represented by a cell at least one ray 4 and at least one absorption threshold is used to generate a feature vector that encodes the relative position to a local property given by values on the spatial semantic environment map.

The ray based feature extraction provides the advantage of even taking into account more distant positions along the ray 4 for the analysis instead of only analyzing the next grid position. In particular the arbitrary formed rays 4 enable to integrate more complex semantic structures to be regarded for the feature extraction and subsequent classification.

In FIG. 3A a spatial grid is shown on a segment of a road 1. The spatial grid comprises a plurality of grid points 2 as spatial locations 2 arranged in rows and columns in a regular manner. In the uppermost row of the spatial grid a grid point 2 is displayed as a selected origin cell 3 (origin point, base point, BP). The selected origin cell 3 will be used in FIG. 3B for demonstrating the principles of ray based feature generation. Each grid point 2 in the spatial grid may represent a grid cell of the spatial grid.

Although the spatial grid in FIG. 3a is displayed as a regular grid formed by equally formed grid cells, other grids comprising grid cells of different shapes are also possible. The grid may be represented by grid cells or by grid points, wherein each grid point represents a cell without deviating from the invention.

Figure 3B:
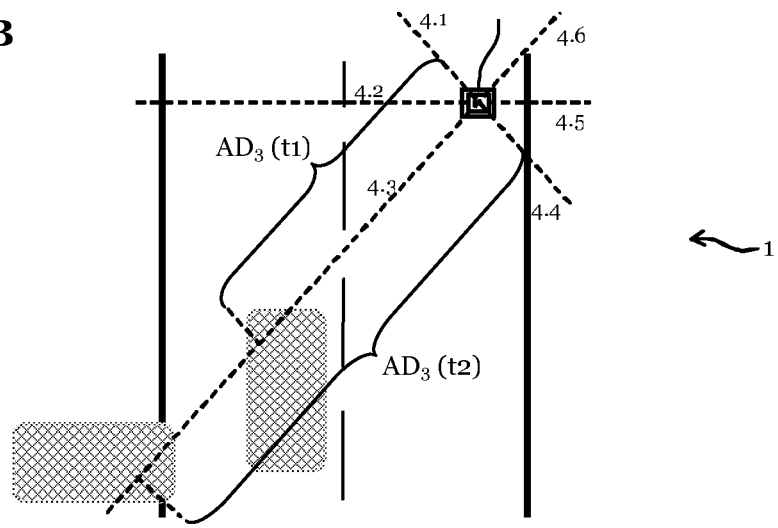
FIG. 3B shows an example of a feature computation based on spatial rays for a specific location in the spatial grid of FIG. 3A.

In FIG. 3B the generation of a spatial feature for a specific location in the environment of the vehicle is depicted. The generation of a spatial feature comprises determining a ray 4, wherein a ray is defined as an arbitrarily shaped line starting from the origin cell in the environment. Confidence values are analyzed along the ray 4 to extract the spatial feature. The spatial layout computation is exemplary shown for one origin cell 3 on a simplified confidence map for a stretch of a two-lane road 1 with lane markings in the center and curbstones on the left and right side. Spatial features are extracted along six rays 4 numbered counter-clockwise 4.1, 4.2, 4.3, 4.4, 4.5, 4.6. For the third ray 4.3 additionally the absorption distances $AD_3(t_1)$ and $AD_3(t_2)$ are illustrated for two thresholds t1 and t2.

Along ray 4.3 in FIG. 3B confidence values of one semantic labels are accumulated. The accumulation may be performed by integrating the values to provide a curve 10 for an integrated semantic label.

Figure 3C:
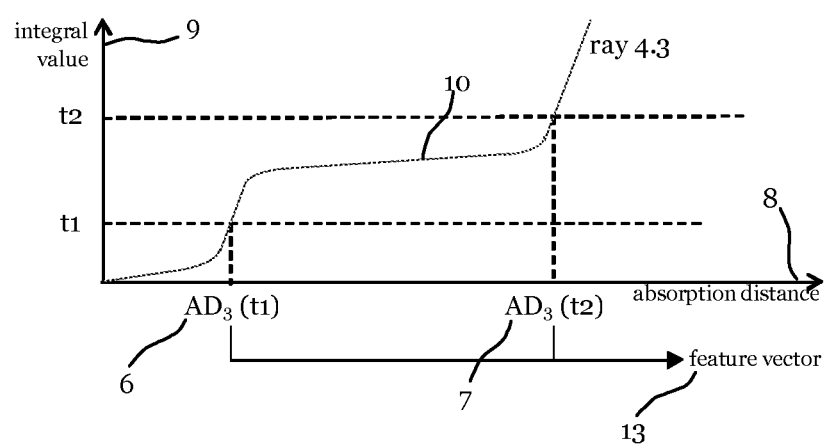
FIG. 3C shows exemplarily the feature computation based on a spatial ray.

In FIG. 3C the accumulated values are shown with the abscissa indicating an absorption distance 8 and the ordinate axis indicating the accumulated value or here, the integrated value 9. The integrated value 9 exceeds a threshold t1 at an absorption distance $AD_3$ (t1) and a threshold t2 at an absorption distance $AD_3$ (t2). In an embodiment the absorption distances $AD_3$ (t1) and $AD_3$ (t2) are saved as elements of a feature vector 13. This feature vector 13 is used as an input for the classification in step S4 of FIG. 1.

Preferably the analysis of the confidence values along the ray is performed by integrating the confidence values along the ray 4.3, and extracting the ray length $AD_3$ (t1) and $AD_3$ (t2), at which the integrated value 10 exceeds at least one absorption threshold t1, t2, which is a certain numeric value.

Preferably, for a specific origin cell 3 in the environment, at least one ray 4 and at least one absorption threshold t1, t2 is used to generate a feature vector 13 that encodes the relative position to a local property given by a confidence map. Using ray features allows for capturing specific spatial information of a more global environment like e.g. properties in a certain angular direction and distance.

The flow diagram in FIG. 2 shows a possible implementation of the algorithm mentioned above for calculating the absorption distance given one ray 4 and a certain threshold $t_i$.

Instead of the integration-based absorption distances described in FIGS. 2 and 3C, also other techniques can be used to compute the spatial features. For example, instead of extracting threshold-based absorption distances $AD_3$ (t1) and $AD_3$ (t2), the integral can be analyzed for other properties, like e.g. the shape of the integral. As another example following the general idea of ray extraction, the gradient of the raw confidence values along the ray 4 could serve as a feature value.

Figure 4A:
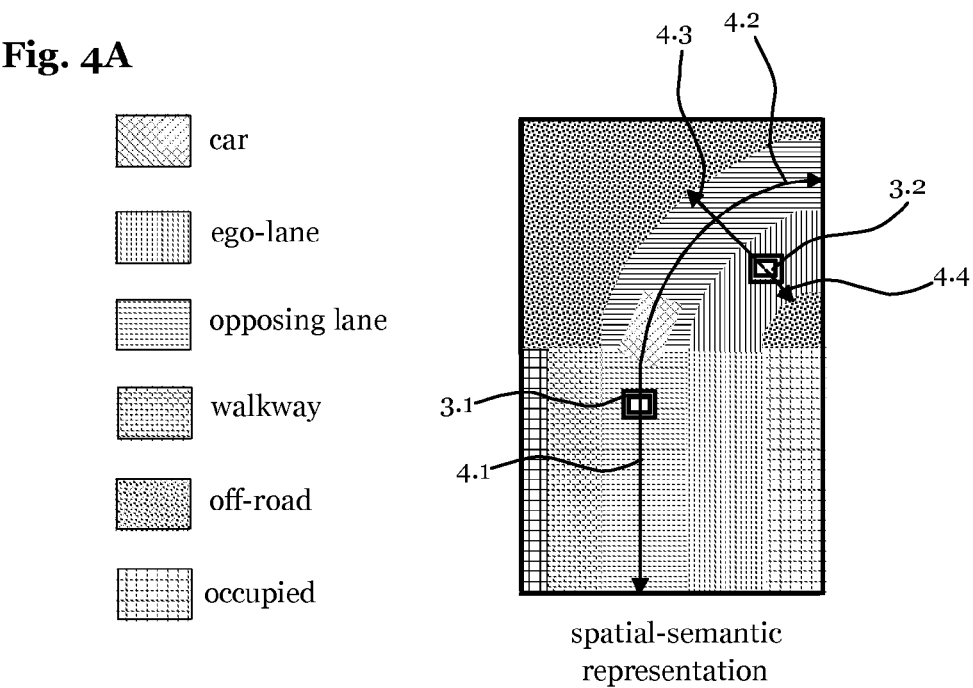
FIG. 4A shows spatial ray shapes according to an embodiment.
Figure 4B:
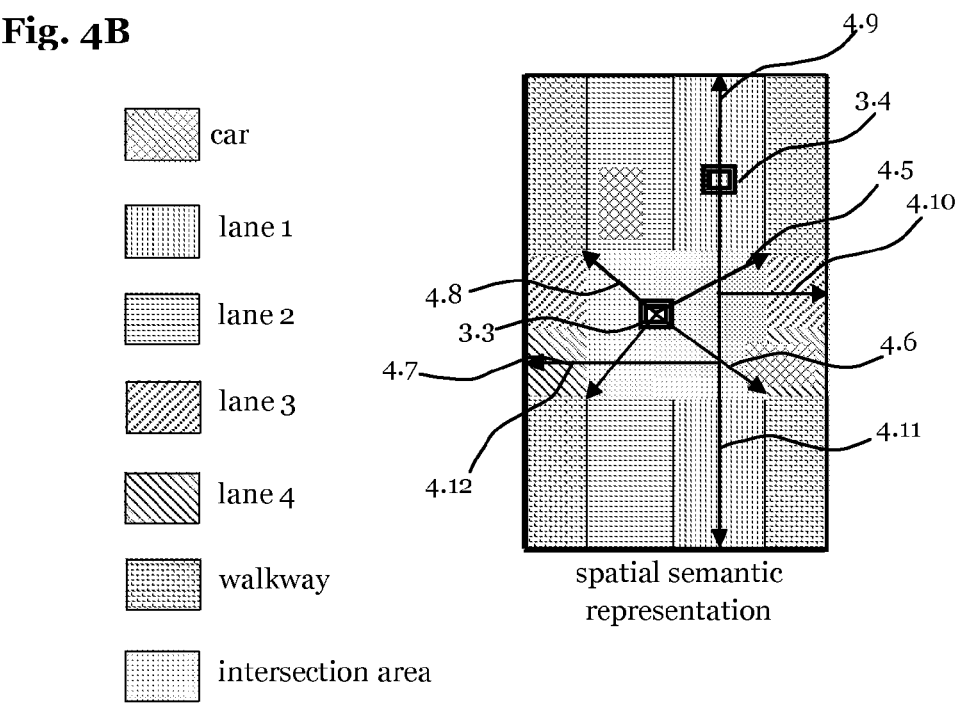
FIG. 4B shows spatial ray shapes according to an embodiment.

In FIGS. 4A and 4B examples for ray shapes adapted to the spatial semantic context are given. In FIG. 4A, a spatial semantic environment map 1 includes a plurality of categories such as "car", "ego-lane", "opposing lane", "walkway", "off-road" and "occupied". The left portion of the FIG. 4A defines the respective area indicator for each of the categories in the spatial semantic environment map 1 as shown in the right portion of FIG. 4A. The right portion of FIG. 4A provides a spatial semantic environment representation for a portion of a curved road. A grid cell 3.1 in FIG. 4A sends out rays 4.1, 4.2 that have a ray shape following the global shape of a road. A grid cell 2 in FIG. 4A as an origin cell 3.2 sends out rays 4.3, 4.4 that are adapted to the local semantics of the scene by being cast perpendicular to a local orientation of the road in the origin cell 3.2.

In FIG. 4B the depicted spatial semantic representation provides a further example of different ray shapes of rays 4 based on the semantic label of the respective origin cell 3. The origin cell 3.3 has a label "intersection area" according to the spatial semantic environment map in the right portion of FIG. 4B. The selected or computed ray shapes include straight rays 4.5, 4.6, 4.7, 4.8 extending from the origin cell 3.3 to the corners of the rectangular intersection area. On the other hand the origin cell 3.4 sends rays 4.9, 4.10, 4.11, 4.12 with ray shapes suitable to cover all possible lanes of origin and a future lane for a vehicle passing through the origin cell 4.4.

Thus in FIGS. 4A and 4B for four different origin cells 3 and a plurality of rays 4 with differing ray shapes in dependence from the respective semantic label of the origin cell 3 are shown.

Figure 5:
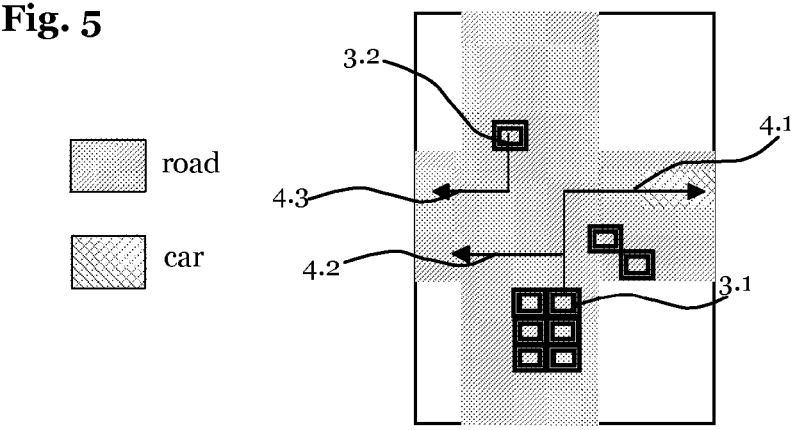
FIG. 5 shows a spatial scene categorization according to an embodiment.
Figure 5:
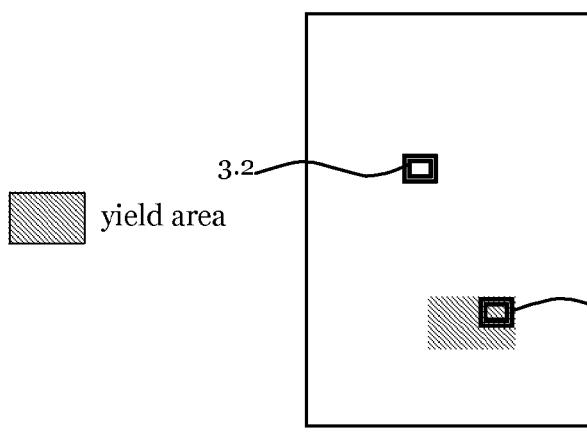

FIG. 5 gives an example for a spatial scene categorization according to an embodiment of the invention. Every grid point 2 representing an origin cell 3.1, 3.2 in FIG. 5 sends out a number of spatial rays 4.1, 4.2, 4.3. The shape of each spatial ray 4.1, 4.2, 4.3 is determined by the semantic context of the origin cell 3.1, 3.2. Each ray shape is determined to follow the course of the road at the intersection as depicted in the upper part of FIG. 5.

The spatial ray features are extracted by performing the method steps S31 to S33 of FIG. 2. In particular along the rays 4.1, 4.2, 4.3 the values of defined semantic categories or labels are integrated. In FIG. 5 the semantic value of the label "car" is integrated. The distance $AD^r$ in which the integral of a ray 4.1, 4.2, 4.3 reaches a predefined threshold $t_i$ is used as a feature. In the example depicted in FIG. 5 the feature $AD^r$ computed for the ray 4.1 reaches a threshold t at a distance of 10 m. The computation of the feature $AD^r$ is executed by integrating the labels "car" along the ray 4.1.

In the center portion of FIG. 5A examples for the ray spatial features for the origin cells 3.1 and 3.2 are given. The respectively calculated spatial ray features are $AD^r$ (ray 4.1, car)=10 m and $AD^r$ (ray 4.2, car)=infinite value (inf) for the origin cell 1. The corresponding values for the ray 4.3 for the origin cell 3.2 are $AD^r$ (ray 4.3, car)=inf.

The calculation of the other features $AD^r$ for the respective origin cell 31, 3.2 is executed in a corresponding manner. The result for the feature extraction is depicted in the center portion of FIG. 5. The extracted features are used in a classification step S4 for spatial scene classification. In the shown example a classifier for a semantic category "yield" uses the combined features of all rays 4.1, 4.2, 4.3 for all label integrals and all thresholds t of a given grid cell to compute a confidence value for the category "yield" in this grid cell.

Performing the classification for all grid cells and for example comparing the calculated confidence values to a threshold, provides a spatial scene representation of the complete environment. The provided spatial scene representation provides detailed spatial information about the category "yield". In the lower portion of FIG. 5, the exemplary scene representation shows areas where the ego-vehicle has to yield for other vehicles by a certain texture. The generated spatial scene representation may be provided for example in the form of a labeled spatial semantic environment map to a prediction system component for further processing in an Automated Driving Assistance System and form the basis for an actuation signal for an actuator of the ego-vehicle or display.

Figure 6:
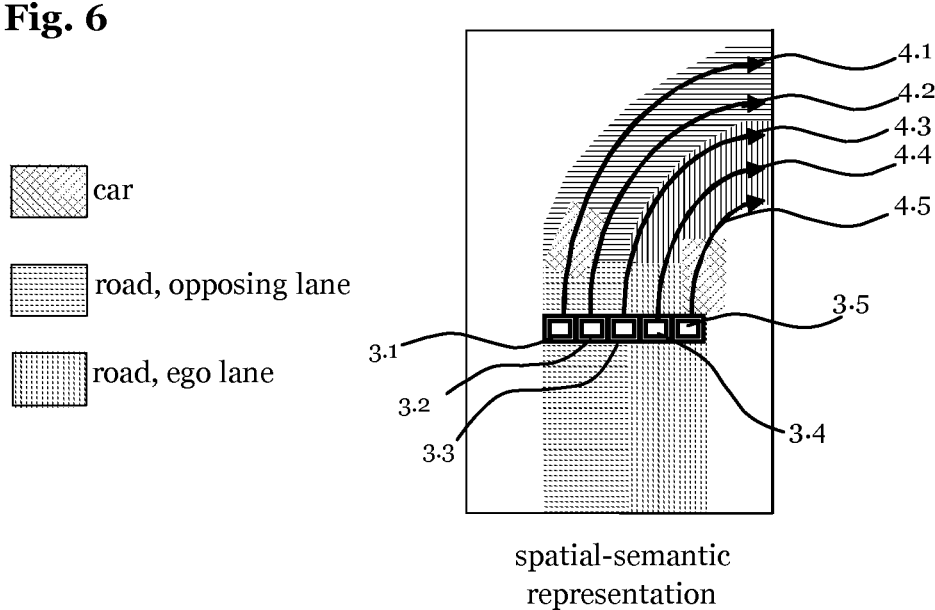
FIG. 6 shows a spatial scene categorization according to an embodiment.
Figure 6:
Figure 6:

FIG. 6 gives a further example for a spatial scene categorization according to an embodiment of the invention. In the upper portion of FIG. 6 a spatial semantic representation of a traffic scene is shown. The traffic scene represents a section of a curved road with one lane into each driving direction and two vehicles, one vehicle on the opposing lane and one vehicle at the side of the road and partially obstructing the ego-lane. A number of grid points is selected as origin cells 3.1, 3.2, 3.3, 3.4, 3.5 for the spatial scene analysis. The spatial rays 4.1, 4.2, 4.3, 4.4, 4.5 have a ray shape which is computed according to the spatial scene context, in the depicted example to follow the curvature of the road. The sequence of feature extraction steps follows the flowchart of FIG. 2 and as discussed for FIG. 5 in a corresponding manner. The center portion of FIG. 6 lists the features as extracted for the origin cells 3.1, 3.2, 3.3, 3.4, 3.5. In FIG. 6 one single classifier uses a combination of features extracted for all origin cells 3.1, 3.2, 3.3, 3.4, 3.5 in order to compute a confidence value for a global scene category "narrow". The global scene category "narrow" characterizes a traffic scene where the space for maneuvers will be generally limited. From the extracted spatial ray features $AD^r$ (ray 4.1, car)=4 m, $AD^r$ (ray 4.2, car)=7 m, $AD^r$ (ray 4.3, car)=inf, $AD^r$ (ray 4.4, car)=inf and $AD^r$ (ray 4.5, car)=1 m, a combined confidence value of narrow (3.1, 3.2, 3.3, 3.4, 3.5)=0.75 is computed which describes a confidence for an only limited lateral room for maneuvering with a linear value.

Figure 7:
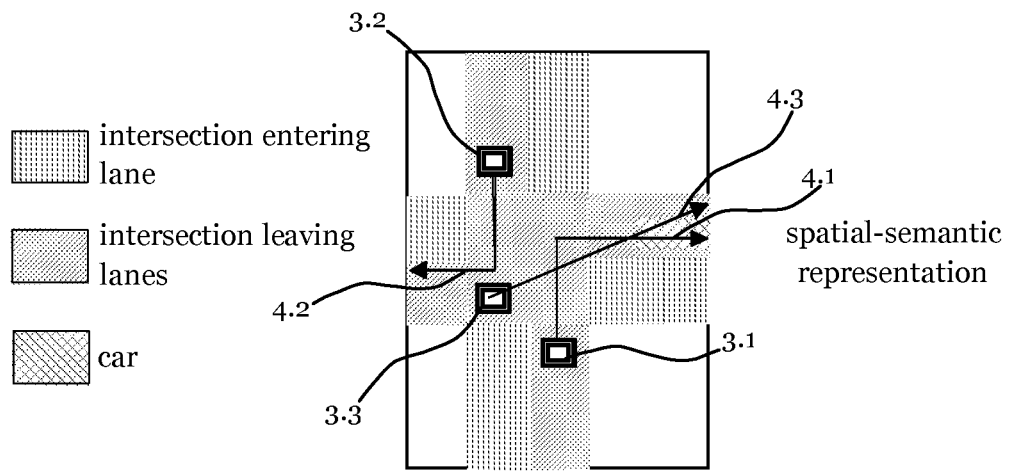
FIG. 7 shows a classification of yield spaces in an embodiment.
Figure 7:
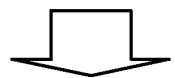
Figure 7:
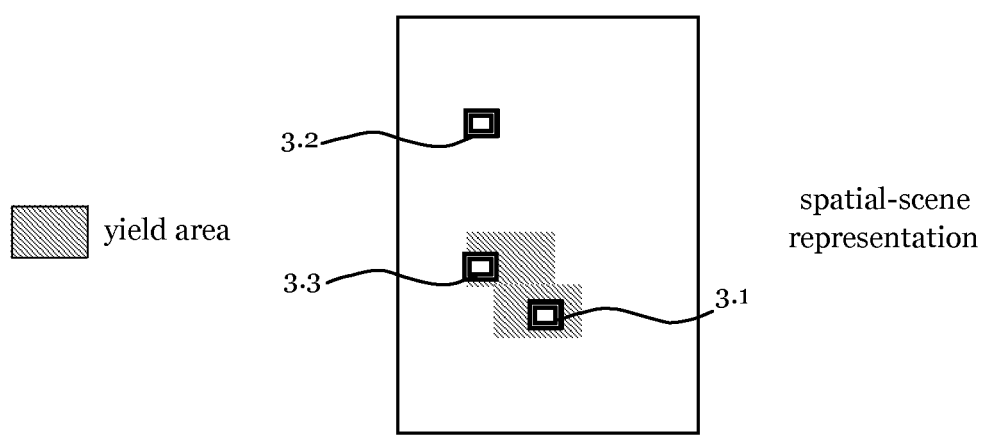

FIG. 7 depicts an example for the classification of yield spaces using an embodiment of the invention. The method is used to determine for every point in traffic space, if a vehicle passing this point of the traffic space has to give way to another car.

In the upper portion of FIG. 7 the input data is shown in the form of a spatial-semantic representation with labels for different lanes and cars at an intersection area. For each grid cell 2 of this semantic-representation, the ray shapes are calculated in dependence of the task of determining yield spaces and the semantic label of the origin cell 3.1, 3.2, 3.3 of the respective ray 4. Every grid cell 2 that lies on a lane entering the intersection is determined to send out rays 4 that make a right turn onto the opposing intersection entering lane at the intersection. In FIG. 7 grid cells 2 as origin cells 3.1, 3.2 show such a ray shape. A grid cell 2 as origin cells 3.3 within the intersection area sends out a ray 4.3 with a ray shape calculated to extend into the opposing straight lane. In the example in FIG. 7 the origin cell 3.3 is an example of a grid cell 2 in the intersection area of the described road segment.

After having determined the ray shape of the rays 4.1, 4.2, 4.3 and computed the respective rays 4.1, 4.2, 4.3 for the origin cells 3.1, 3.2, 3.3 a first group of features is computed. The first group of features of the present embodiment counts the number of occurrences of the semantic label "car" along a ray 4 and the distance on the ray 4 up to the first occurrence of the label "car" along the ray 4 is measured. In the example of FIG. 7 the right-turning rays 4.1, 4.2 extending from grid cells 3.1 3.2 provide results of a feature F1 for origin cell 3.1 to be 10 m; the feature F1 for origin cell 3.2 is computed as an infinite value. For the straight ray 4.3 extending from origin cell 3.3 in FIG. 7, a feature F2 is computed as 3 m for the shown example.

After having extracted the features, step S4 of spatial scene classification is performed. For spatial scene classification, a classifier is used which is trained before with a corresponding process using data in which the yield areas are annotated. The training of the classifier is assumed to have resulted in classifying a grid cell 2 as belonging to the category "yield" when a feature F1 is small, for example smaller than 15 m or a feature F2 is very small, for example smaller than 10 m. When applying this classifier to the grid cells 2 in the traffic scene of FIG. 7, the embodiment of the inventive method results in a spatial scene representation as depicted in the bottom half of FIG. 7. In the spatial scene representation of FIG. 7, the grid cells 2 classified to belong to the category "yield" are marked with the respective graphical representation of their category or label "yield". For orientation, the exemplary origin cells 3.1, 3.2, 3.3 of the spatial-semantic scene representation in the upper portion of FIG. 7 are repeated in the bottom portion of FIG. 7 in the spatial scene representation.

Figure 8:
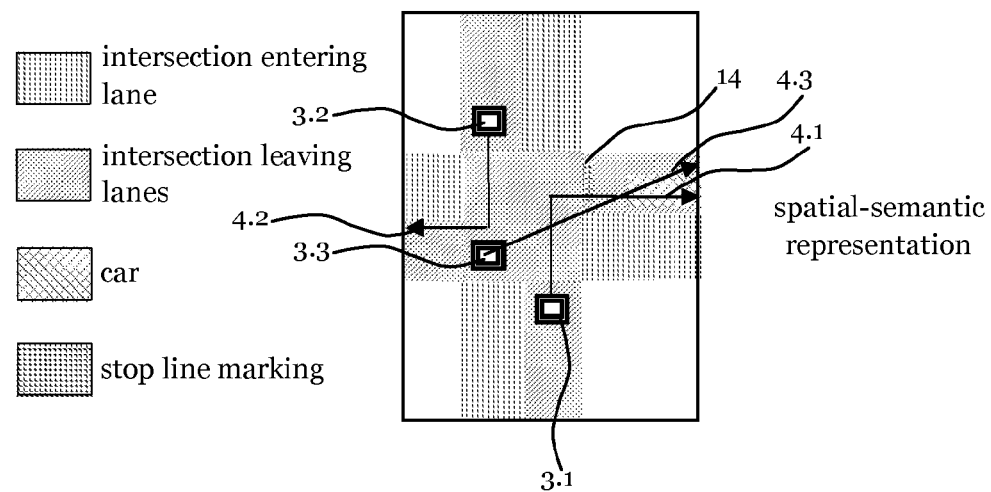
FIG. 8 shows a further example of a classification of yield spaces in an embodiment.
Figure 8:
Figure 8:
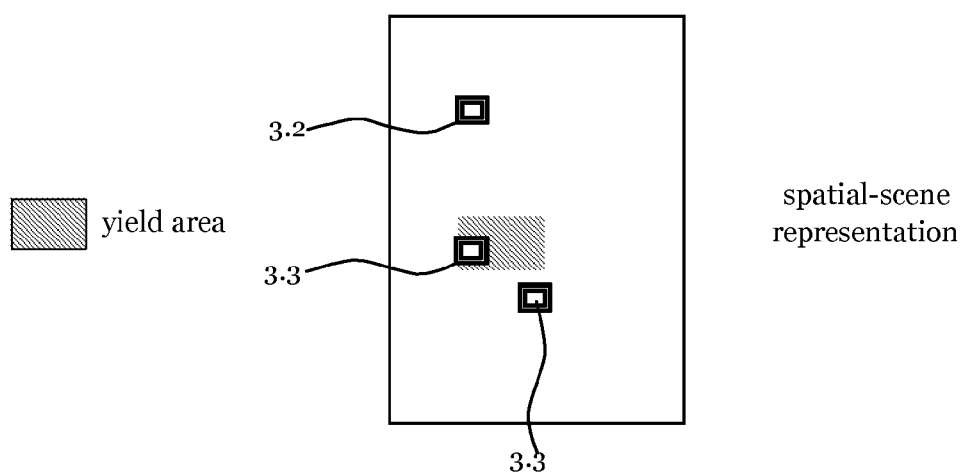

FIG. 8 shows a further example of a spatial scene representation according to an embodiment of the invention. The spatial semantic representation in the upper portion of FIG. 8 depicts an intersection situation corresponding to the traffic situation depicted in FIG. 7. The traffic scene in FIG. 8 differs from the traffic scene shown in FIG. 7 by the addition of a stop line 14 as an example for a further regulation.

The inventive method is executed as described before with respect to FIG. 7. In order to take account of the additional traffic regulation, an additional feature is to be extracted, which corresponds to a distance to a stop line 14 calculated along all right turning rays 4. In the given example in the spatial-semantic representation in the upper portion of FIG. 8, the additional feature F3 is calculated for an origin cell 3.1 to be 6 m and for an origin cell 3.2 to be of infinite value.

Furthermore, the classifier is to trained with the larger new feature set in order to classify into the category "yield" if the term:

(F1 is small (e.g. smaller than 15 m) AND (F3 is larger than F1)) OR (F2 is very small (e.g. smaller than 10 m))

is true. The lower portion of FIG. 8 provides the respective resulting spatial scene representation after extracting the additional feature and classifying the scene. The example given for the traffic scene with stop line 14 can be further extended to include traffic lights and other traffic objects influencing the semantic interpretation of a traffic flow. A further extension including an additional time dimension into the underlying spatial semantic environment map and the feature extraction step S3 and classifying step S4 is suitable to include car speed into an embodiment of the method for spatial scene analysis.

Figure 9:
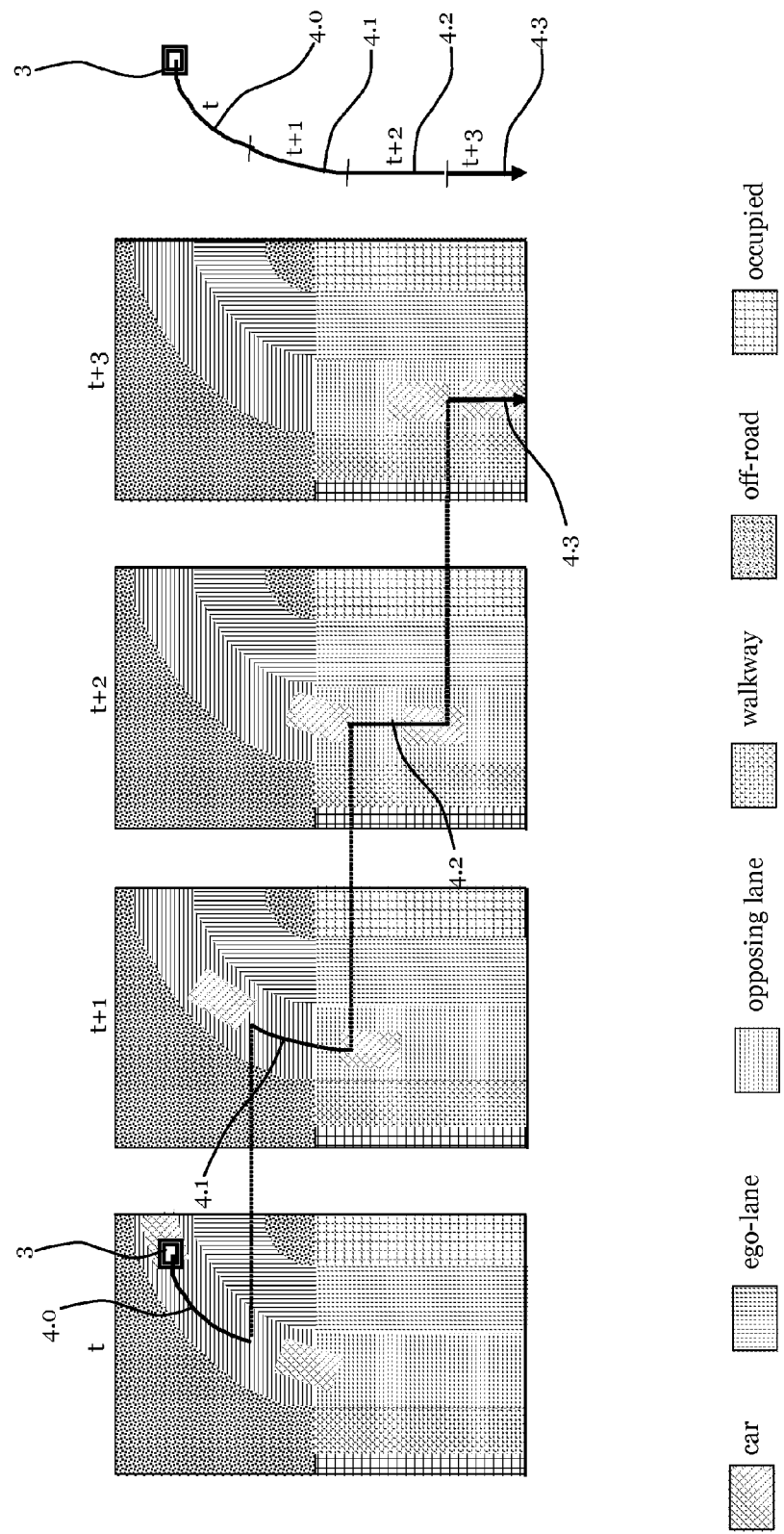
FIG. 9 shows a spatio-temporal scene categorization according to an embodiment.

FIG. 9 shows an example of a ray shape adapted to the spatial semantic context with a shape extending in space and in time.

FIG. 9 shows a spatial semantic representation of a traffic scene for a number of discrete points in time. For each discrete point in time t, t+1, t+2, t+3, . . . a spatial semantic representation in the form of a single slice (layer) of a spatial semantic environment map given is given. A grid cell 2 is selected as a origin cell 3 for a current point in time t. The selected origin cell 3 has the label "car" with a certain velocity.

The computed ray 4.0, 4.1, 4.2, 4.3, 4.4 has a ray shape extending along the opposing lane in the two-dimensional space. However in FIG. 9 the ray is evaluated in the step of extracting a feature in different slices of the semantic spatio-temporal representation. The semantic spatio-temporal representation comprises a plurality of slices representing the spatial layout of the traffic scene, each slice for a discrete time. Ray 4 in FIG. 9 comprises a first ray portion 4.0 evaluated in the slice of the semantic spatio-temporal representation for time t, a second ray portion 4.1 evaluated in the slice of the semantic spatio-temporal representation for time t+1, a third ray portion 4.2 evaluated in the slice of the semantic spatio-temporal representation for time t+2 and a fourth ray portion 4.3 evaluated in the slice of the semantic spatio-temporal representation for time t+3. Hence the specific ray shape of the ray 4.0, 4.1, 4.2, 4.3 in FIG. 9 enables analysis of a traffic scene with respect to its semantic spatial layout for different times in the future.

The spatio temporal ray 4.0, 4.1, 4.2, 4.3 in FIG. 9 can now be used to calculate features using thresholds. The features computed based on spatio temporal ray 4.0, 4.1, 4.2, 4.3 have the unit [time relative to origin cell velocity]. Contrary thereto features computed based on spatial rays have the unit of a distance [m].

Figure 10:
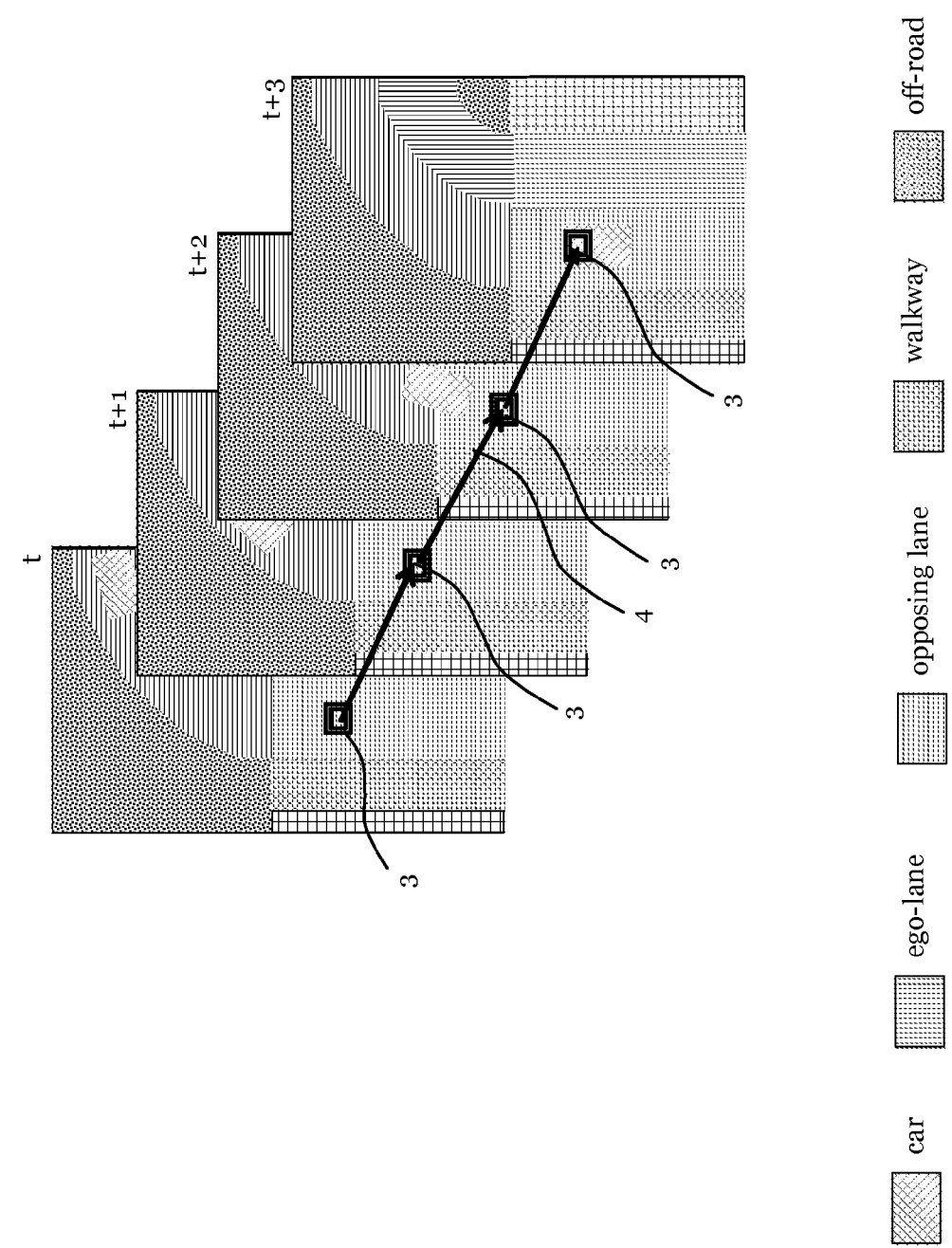
FIG. 10 shows a spatio-temporal scene categorization according to an embodiment.

In FIG. 10 a further example for spatio-temporal scene representation is given. FIG. 10 shows a spatial semantic representation of a traffic scene for a number of discrete points in time. For each discrete point in time t, t+1, t+2, t+3, . . . a spatial semantic representation in the form of a single slice of a spatial semantic environment map given is given. A grid cell 2 is selected as an origin cell 3 for a current point in time t. The selected origin cell 3 has the label "opposing lane".

The computed ray 4 has a ray shape extending alone in the time domain and not in the two-dimensional space. The semantic spatio-temporal representation comprises a plurality of slices representing the spatial layout of the traffic scene, each slice for a discrete time. Ray 4 in FIG. 10 extends from the origin cell 4 only through time and therefore covers the future change of labels of the origin cell 4. Hence the specific ray shape of the ray 4 in FIG. 9 enables analysis of a traffic scene with respect to its semantic spatial layout for different times in the future. Therefore the change of labels for the origin cell 4 can be evaluated by extracting features along the ray 4 of FIG. 10 extending alone in time. The extracted features will have the unit of a time and define at which time the origin cell 4 gets assigned certain labels.

Figure 11:
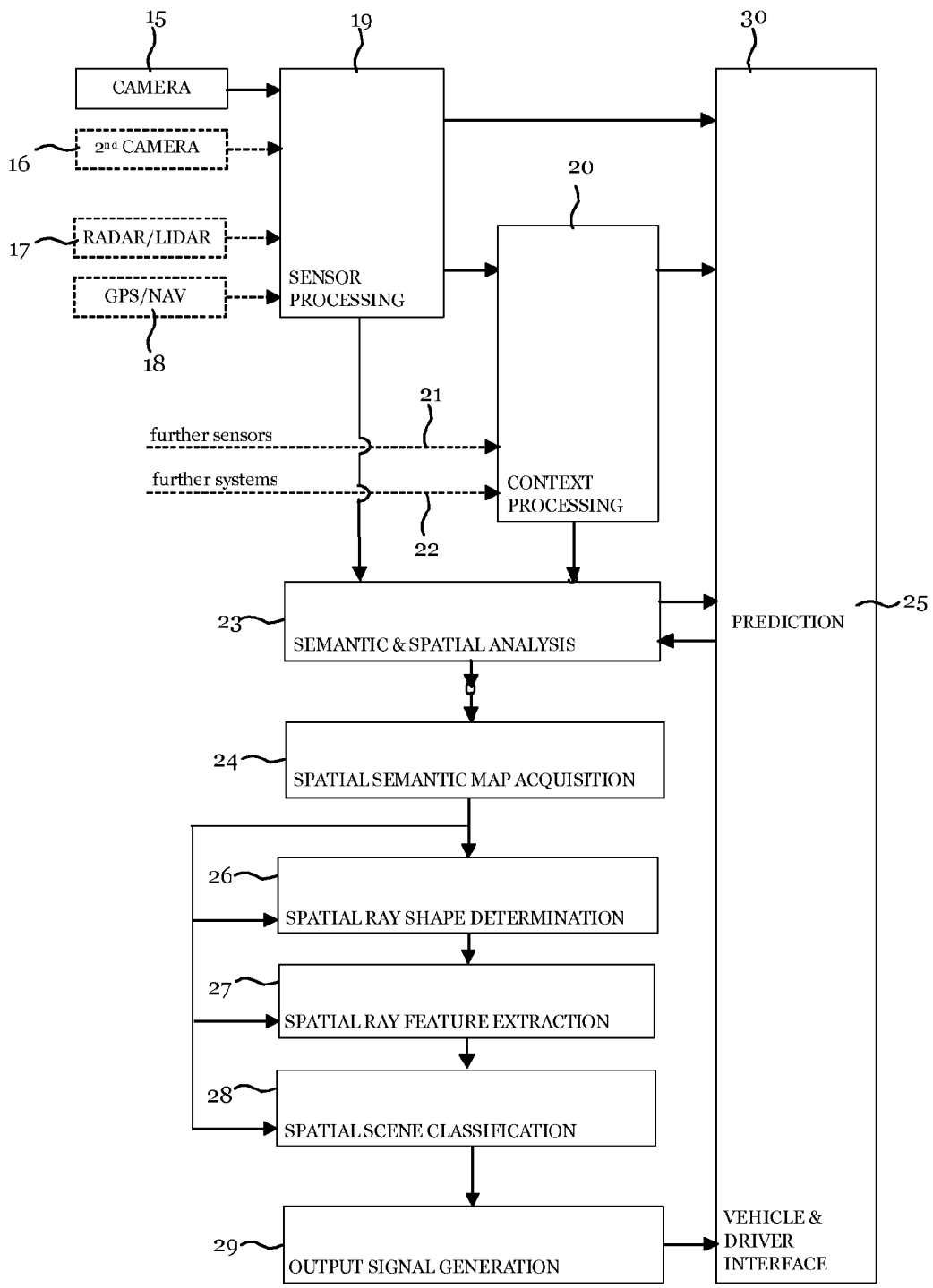
FIG. 11 shows a block diagram of the principal processing modules of an embodiment.

FIG. 11 provides an overview of a automated driver assistance system with the functional units (means) executing the steps of the method of the present invention which implements an adaptive spatial ray-based scene analysis of the semantic traffic spaces and can be used to provide context information in active safety systems for driver assistance or control information for the generation of actuator commands for autonomous driving.

One or more sensor means such as camera(s) 15, 16, radar sensors 17, lidar sensors, laser scanners, positioning systems 18 such as GPS, provide the input data for a sensor processing means 19. Further sensor data 21 and data 22 acquired from other systems such as car-to-car communication, car-to-infrastructure communication, radio traffic services, or else, provide information on the context of a traffic scene. A semantic and spatial analysis means 23 is configured to generate a spatial semantic environment map 1 from the processed sensor data and processed context data received from the sensor processing means 19 and the context processing means 20. This spatial semantic environment map 1 is acquired by the spatial semantic map acquisition means 24 which is one of the processing modules for executing the inventive adaptive spatial ray-based scene analysis. The acquired spatial semantic environment map can in one embodiment also include temporal information. The temporal information may be acquired for example from a prediction system 25 forming part of the ADAS of the vehicle. A spatial semantic environment map 1 including temporal information can for example comprise a plurality of slices (layers), whereby each slice represents the spatial semantic information for one point in time t, t+1, t+2, . . . .

The spatial ray shape determination means 26, the spatial ray feature extraction means 27 and the spatial scene classification means 28 each receive the acquired spatial semantic environment map 1 from the spatial semantic map acquisition means 24 for further processing.

The ray shape determination means 25 determines the at least one ray having a ray shape based on the semantic context of the at least one origin cell or the classification task to be solved. The at least one location corresponds to the origin cell 4 in the grid received from the spatial semantic map acquisition means 24.

The spatial ray feature extraction means 27 calculates at least one feature for at least one origin cell on the spatial semantic environment map 1 taking into account the semantic context of the origin cell. In one embodiment the spatial ray feature extraction means 27 is adapted to calculate the at least one feature as a ray based feature by integrating semantic input values along at least one ray extending in least one of a space dimension and a time dimension from an origin cell 3. The spatial ray 4 has a ray shape determined by the ray shape determination means 26 based on the semantic context of the origin cell 3. Calculating a feature in the spatial ray feature extraction means 27 can be performed for example by executing occurrences of a semantic label or integrating input values along the ray 4.

The spatial scene classification means 28 is adapted to determine a category or class for the at least one origin cell 3 based on the at least one calculated feature calculated by the spatial ray feature extraction means 27.

The output means 29 generates and outputs an analysis signal comprising data on the determined category of the at least one location for analysing a traffic scene. The output signal is transmitted to a vehicle and driver interface means 30 which provides the output signal and the data included therein to the vehicle and driver interface means 30 for distribution to other processing modules of the ADAS system, for example a prediction unit for predicting future behaviour of other vehicles, to actuating means for influencing the control of the ego-vehicle or to means for informing a driver of the ego-vehicle by acoustic, visual or haptic signals of a result of the scene analysis.

The invention is not restricted to the exemplary embodiment presented. On the contrary, individual features of the embodiments can be advantageously combined with each other.

The invention claimed is:

1. A method for spatial analysis of a traffic scene, comprising:
   acquiring a spatial semantic environment map including semantic context data, wherein the semantic context data are confidence values or binary values for a semantic label for grid cells of the spatial semantic environment map,
   calculating at least one feature for at least one cell on the spatial environment map taking into account the semantic context of the cell,
   wherein the at least one feature is a ray based feature calculated by integrating confidence values or binary values to provide an integrated semantic label along at least one ray extending from the at least one cell in at least one of a space dimension and a time dimension,
   determining a category for the at least one cell based of the at least one calculated feature, wherein the at least one ray has a ray shape which is determined based on the semantic context of the at least one cell where it starts, and
   generating and outputting an analysis signal comprising data about the determined category of the at least one cell for predicting a traffic scene.

2. The method according to claim 1, wherein
   the at least one ray is a spatially extending ray,
   wherein the spatially extending ray has a ray shape corresponding to a general shape of a road or the at least one spatially extending ray follows a course of the road and/or is perpendicular to a surrounding road segment orientation or bypasses at least one area on the spatial semantic environment map.

3. The method according to claim 1, wherein
   the at least one feature corresponds to a distance at which integrated input values integrated along the at least one ray exceed at least one predetermined threshold.

4. The method according to claim 1, further comprising:
   performing the method for spatial evaluation of a traffic scene separately for at least one further cell of the spatial semantic environment map.

5. The method according to claim 1, further comprising:
   applying a label each to the at least one cell of the spatial semantic environment map,
   wherein the label is determined based on the determined category for the at least one cell.

6. The method according to claim 1, further comprising:
   determining the category for each ray based feature of a set of ray based features or on a selected number of ray based features of a set of ray based features.

7. The method according to claim 1, further comprising:
   determining a general scene category for the traffic scene based on the spatial analysis of the traffic scene.

8. The method according to claim 1, wherein
   the spatial semantic environment map comprises areas labelled with an area type, and/or
   the spatial semantic environment map comprises multiple layers, wherein the layers refer to different points in time in a time dimension.

9. A computer program embodied on a non-transitory computer-readable medium, said program comprising program-code for executing the steps according to claim 1, when the program is executed on a computer or digital signal processor.

10. A system for spatial analysis of a traffic scene, the system comprising:
    an acquisition means configured to acquire a spatial semantic environment map including semantic context data, wherein the semantic context data are confidence values or binary values for a semantic label for grid cells of the spatial semantic environment map,
    a spatial ray feature extraction means configured to calculate at least one feature for at least one cell of the spatial environment map taking into account the semantic context of the cell,
    wherein the spatial ray feature extraction means is configured to calculate the at least one feature as a ray based feature by integrating confidence values or binary values along at least one ray extending in at least one of a space dimension and a time dimension,
    a ray shape determination means configured to determine the at least one ray having a ray shape based on the semantic context of the at least one cell,
    a classification means configured to determine a category for the at least one cell based on the at least one calculated feature, and
    an output means configured to generate and output an analysis signal comprising data about the determined category of the at least one cell for predicting a traffic scene.

11. A vehicle including the system for the spatial analysis of a traffic scene according to claim 10, wherein
    the driver assistance system is configured to influence control of the ego-vehicle based on output signals of the driver assistance system.

* * * * *